June 10, 1952
J. M. WALTER
2,599,679
MACHINE TOOL CONTROL
Filed Sept. 16, 1947
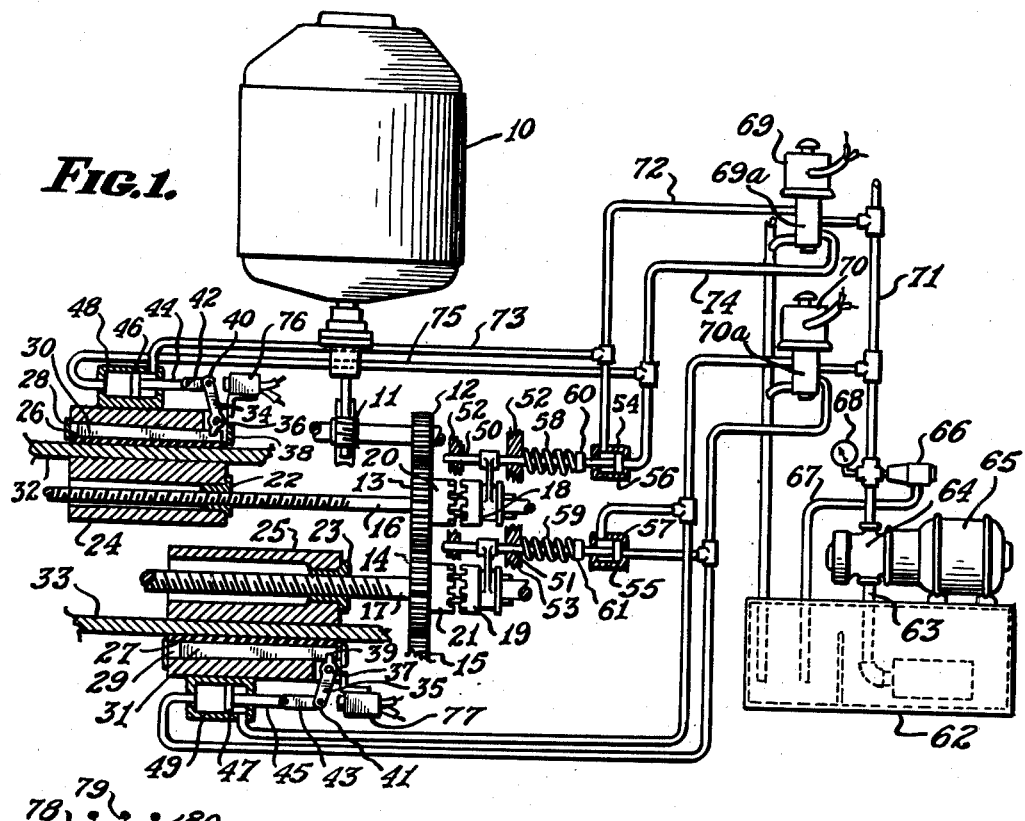
FIG.1.
FIG.2.
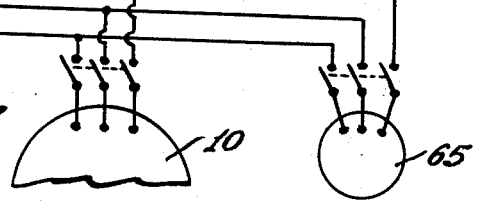
INVENTOR.
JOHN M. WALTER.
BY Allen & Allen
ATTORNEYS.

Patented June 10, 1952

2,599,679

UNITED STATES PATENT OFFICE 2,599,679

MACHINE TOOL CONTROL

John M. Walter, Cincinnati, Ohio, assignor to The G. A. Gray Company, Cincinnati, Ohio, a corporation of Ohio Application September 16, 1947, Serial No. 774,282

3 Claims. (Cl. 29—33)

This invention relates to a machine tool control and more particularly to a control for machine tools of the type having a motor and a number of elements selectively driven thereby. The particular type of machine tool to which this invention has been applied is what is known as a planer-type boring machine or a planer-type boring, drilling and milling machine.

Machines of this type include usually a column which is movable on a base and which carries a head which is movable on the column. The head carries a spindle rotatable therein. In machines of this type there is usually one motor which is arranged to drive selectively either the column, the head or the spindle. The pendant station for the machine usually carries a knob by means of which selection may be made of the particular element to be driven by the motor.

In machines of this type a very accurate control of the movement of the elements is desirable and it is highly desirable that the elements be locked against movement when they are not being driven by the motor. It is therefore an object of my invention to provide in connection with each of the elements above described a clamping or locking means as well as a driving means including a clutch and to arrange the clamping means and the clutch in such a way that they are simultaneously actuated to produce engagement of one and disengagement of the other. Thus when it is desired to drive one of the elements, that element is simultaneously unclamped and clutched in and when that element is to be stopped, it is simultaneously clamped and unclutched.

Another object of my invention is to control the clamping and clutching hydraulically by means of an hydraulic system including cylinders and actuating pistons.

Since any hydraulic system may fail, it is a further object of my invention to provide an arrangement whereby damage to the machine and/or the work is obviated in the event of failure of the hydraulic system. In this connection it is a still further object of my invention to provide means tending to maintain the individual clutches disengaged and to arrange the hydraulic operation in opposition to these means.

Since the single motor must drive any one of, say, there different elements, and to insure safety to the machine, it is yet another object of my invention to provide an arrangement whereby two steps are necessary to produce operation of the motor. In this connection it is another object of my invention to provide a main motor starting switch and in connection with each element an enabling switch connected in such manner that pressing of the motor starting switch will not cause the motor to operate unless one of the enabling switches has been closed.

These and other objects of my invention, which I shall point out in more detail hereinafter or which will suggest themselves to those skilled in the art as the description proceeds, I accomplish by that certain construction and arrangement of parts of which I shall now describe an exemplary embodiment.

Reference is made to the drawings forming a part hereof and in which:

Figure 1 is a schematic diagram of a motor and two of the elements to be driven thereby, showing the clamping means, the clutching means and the hydraulic circuit.

Figure 2 is a wiring diagram of the same.

For the sake of simplicity, I have shown in the drawings only two elements driven from the motor, but it will be clear that the system is carried out in the same manner for a third element, or as many different elements as it is desired to drive. In Figure 1 the driving motor is indicated at 10. The motor 10 through gearing indicated generally at 11 drives a pinion 12. The pinion 12 meshes with a gear 13, which in turn meshes wtih a gear 14, which in turn may mesh with yet another gear 15, and so on. The gears 13, 14, 15, etc. are the driving gears for the elements to be driven. Each of the gears 13, 14, 15, etc. is free to rotate on a shaft 16, 17, etc. and each of the shafts 16, 17 etc. has splined to it a clutch element 18, 19 etc. Each of the gears 13, 14 etc. has secured to it a clutch element 20, 21 etc.

It will be clear that engagement of the clutch elements 18, 20, 19, 21 will produce rotation of the respective shafts 16, 17 etc. The shafts 16 and 17 shown in Figure 1 may be considered as those to operate the column and head, for example, and in each case the shafts are threaded and engage respectively the nuts 22 and 23 secured respectively to a part of the column and a part of the head, so that as the shaft 16 or 17 rotates, the nut 22 or 23 will cause the respective frame element 24 or 25 to move along the respective lead screw 16 or 17.

In connection with each of the frame elements 24 and 25, I provide clamping means. These include a clamping plate 26, 27 retained in a recess 28, 29 of the frame, which recess is tapered as shown and a tapered gib 30, 31 may have slight longitudinal movement in the recess. It will be clear that movement of the gib 30 to the right of Figure 1 will cause the plate 26 to be pressed against the ways 32 to prevent relative movement between the frame and the ways and that, similarly, movement of the gib 31 to the right will lock the frame member 25 against movement with respect to the ways 33.

The gibs 30 and 31 are actuated by bell crank levers 34, 35 which are pivoted respectively at 36 and 37. The short arms 38, 39 of the bell cranks engage notches in the gibs 30 and 31, while the longer arms are pivoted, as at 40 and 41, to links 42 and 43 which are pivoted to the piston rods 44 and 45 of the hydraulic pistons 46, 47 which reciprocate in the cylinders 48, 49.

The clutch elements 18 and 19 referred to above are secured to the actuating rods 50, 51 which have bearings in frame elements as at 52 and 53. The rods 50 and 51 constitute piston rods for the hydraulic pistons 54 and 55 operating respectively in the cylinders 56, 57. Each of the shafts 50 and 51 is surrounded by a compression spring 58, 59 bearing at one end against a frame member 52, 53 and retained by a collar 60, 61.

From the foregoing description, it will be clear that movement to the left of the piston 54 or 55 will produce engagement of the clutch element 18 or 19 respectively with the clutch element 20 or 21 and that the springs 58 and 59 normally tend to maintain the clutches disengaged.

The hydraulic system comprises a reservoir 62 from which fluid is pumped through an intake 63 by a pump 64 driven by a motor 65. A pressure relief valve is provided at 66 with a return line 67 to the reservoir. A suitable pressure gauge may be provided at 68.

Solenoid operated valves are indicated at 69 and 70. The valves 69 and 70 are actuated by the selector knob on the pendant station as described above. Taking up first the valve 69, in one position a circuit is established from the pump 64 through the line 71 through the valve 69a associated with the solenoid 69 through the line 72 to the left-hand end of the cylinder 56 and through the line 73 to the right-hand end of the cylinder 48. This will produce movement to the right of the piston 54 bringing about a disengagement of the clutch elements 18 and 20. It will also produce a movement to the left of the piston 46 which causes a movement to the right of the gib 30 to produce a clamping action.

In the other position of the valve 69a, the fluid is pumped through the line 74 to the right-hand end of the cylinder 56 to produce movement of the piston 54 to the left to cause engagement of the elements 18 and 20. The fluid also passes through the line 75 to the left-hand end of the cylinder 48, producing movement toward the right of the piston 46 to cause disengagement of the clamping gib.

The circuits set up by the solenoid operated valve 70 are similar to those described and will not be repeated in the description. It will be understood that a similar circuit is set up for each additional element which is to be driven by the motor.

Adjacent each clamping device, I provide a switch 76, 77 which is normally open. The switch 76, as will be clear from Figure 1, is actuated to be closed upon movement to the right of the piston 46 which produces unlocking of the gib 30. Similarly, the switch 77 is actuated upon movement to the right of the piston 47 which produces unlocking movement of the gib 31.

Referring to the wiring diagram in Figure 2, a source of three-phase current is indicated at 78, 79, 80. The leads 79, 80 are used for control, while the lead 78 is simply the third phase for operation of the motors 10 and 65. A selector switch is indicated generally at 81 and it will be clear that this switch will have as many positions as there are elements to be driven by the motor. Since only two elements were illustrated in Figure 1, I have shown only two positions for this switch, and it will be observed that in the position shown in the drawing at 81a a circuit is established through the solenoid 69 to actuate the valve 69a. In the lower position of the switch 81, at 81b a circuit will be established through the solenoid 70 to actuate the valve 70a. As soon as the switch 81 is moved to the position shown at 81a, the valve 69a is operated by the solenoid 69 to cause the hydraulic circuit to be established to produce clutching of the members 18 and 20 and unlocking of the gib 30. As the gib 30 is unlocked through movement to the right of Figure 1 of the piston 46, the switch 76 is closed and an enabling circuit is set up to the coil 10a for starting the motor 10, so that upon pressing the main starting switch 82, the motor 10 will function. The switch 83 is a normally closed switch which is depressed to open the circuit to stop the motor 10.

It will be noted that the coil 65a for starting the motor 65 is across the line so that the motor 65 is caused to operate as soon as current is supplied between the leads 79 and 80.

From the foregoing description it will be clear that if the switch 81 were in the lower position at 81b, the solenoid 70 would cause the valve 70a to engage the clutch elements 19, 21 and to unclamp the gib 31. Unclamping the gib 31 would close the switch 77 so that upon pressing the starting switch 82, the motor 10 will drive the screw 17.

From the foregoing description it will be understood that a number of safeguards are set up. By virtue of the springs 58, 59 the clutches are immediately opened if there should be a leak or failure of the hydraulic system. By virtue of the switches 76, 77, the motor 10 cannot run until the respective gibs have been unclamped.

It will be clear that numerous modifications may be made without departing from the spirit of my invention, and that while I have shown only two elements to be driven by the motor 10, I have indicated a fragment of an additonal gear at 15 to show that as many other elements as desired may be driven in the same way. I, therefore, do not intend to limit myself in any manner except as pointed out in the claims which follow.

Having now fully described my invention, what I claim as new and desire to secure by Letters Patent is:

1. In a machine tool having a motor and a number of elements selectively driven by said motor, power transmission means between said motor and each of said elements, each of said power transmission means including a clutch, means for clamping each of said elements against movement, normally ineffective control means for each of said clutch and clamping means, means for optionally rendering one of said control means effective, and means responsive to actuation of the selected control means to simultaneously actuate the corresponding clutch and clamping means to produce engagement of one and disengagement of the other, a starting switch for said motor, an enabling switch for said motor associated with each of said clamping means in position to be actuated by the disengagement of said clamping means, said enabling switches being connected in parallel with each other, and in series with said starting switch, whereby said motor cannot operate said element upon closing of said starting switch until its enabling switch is closed by the disengagement of its clamping means.

2. In a machine tool having a motor and a number of elements selectively driven by said motor, power transmission means between said motor and each of said elements, each of said power transmission means including a clutch and spring means biasing said clutch to disengaged position, means for clamping each of said elements against movement, normally ineffective control means for each of said clutch and clamping means, means for optionally rendering one of said control means effective, and means responsive to actuation of the selected control means to simultaneously actuate the corresponding clutch and clamping means to produce engagement of one and disengagement of the other, a starting switch for said motor, an enabling switch for said motor associated with each of said clamping means in position to be actuated by the disengagement of said clamping means, said enabling switches being connected in parallel with each other, and in series with said starting switch, whereby said motor cannot operate said element upon closing of said starting switch until its enabling switch is closed by the disengagement of its clamping means, and whereby upon failure of said actuating means, said springs means will cause said clutches to be disengaged.

3. An apparatus according to claim 2 in which the means for actuating said clutches and clamping means are fluid pistons operating in cylinders which are in parallel fluid circuits including a source of fluid under pressure, each of said parallel circuits including a reversing valve, each of said clutches being engaged by the action of one of said pistons acting in opposition to said spring means, and said spring means acting to disengage said clutches upon failure of said fluid pressure.

JOHN M. WALTER.

REFERENCES CITED

The following references are of record in the file of this patent:

UNITED STATES PATENTS

| Number | Name | Date |
| --- | --- | --- |
| 1,069,995 | Anderson | Aug. 12, 1913 |
| 1,999,225 | Williamson | Apr. 30, 1935 |
| 2,251,015 | Gallimore | July 29, 1941 |